United States Patent [19]
Maurer et al.

[11] 3,892,823
[45] July 1, 1975

[54] O-ETHYL-S-n-PROPYL-O-2-CYANOVINYL-THIONOTHIOL-PHOSPHORIC ACID ESTERS

[75] Inventors: Fritz Maurer; Hans-Jochem Riebel; Lothar Rohe, all of Wuppertal; Ingeborg Hammann, Cologne, all of Germany

[73] Assignee: Bayer Aktiengesellschaft, Leverkusen, Germany

[22] Filed: Jan. 14, 1974

[21] Appl. No.: 433,011

[30] Foreign Application Priority Data
Jan. 18, 1973  Germany.............................. 2302273

[52] U.S. Cl.......... 260/940; 260/465 A; 260/465 E; 260/465 F; 260/465 R; 260/465.5; 424/210
[51] Int. Cl..... C07f 9/16; A01n 9/36; C07e 121/02
[58] Field of Search...................................... 260/940

[56] References Cited
UNITED STATES PATENTS
3,579,614   5/1971   Miller et al. ........................ 260/940

Primary Examiner—Anton H. Sutto
Attorney, Agent, or Firm—Burgess, Dinklage & Sprung

[57] ABSTRACT

O-ethyl-S-n-propyl-O-vinyl-thionothiolphosphoric acid esters of the formula

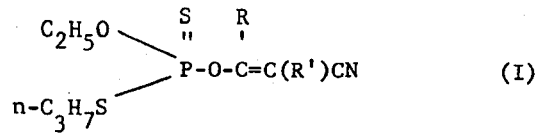

in which
R is lower alkyl, carbo-lower alkoxy, or phenyl or naphthyl optionally substituted by halogen, nitro, nitrile, lower alkyl, lower alkoxy or halo-lower alkyl and
R' is hydrogen or lower alkyl,
which possess insecticidal and acaricidal properties.

7 Claims, No Drawings

O-ETHYL-S-N-PROPYL-0-2-CYANOVINYL-THIONOTHIOL-PHOSPHORIC ACID ESTERS

The present invention relates to and has for its objects the provision of particular new O-ethyl-S-n-propyl-O-vinyl-thionothiolphosphoric acid esters which possess insecticidal or acaricidal properties, active compositions in the form of mixtures of such compounds with solid and liquid dispersible carrier vehicles, and methods for producing such compounds and for using such compounds in a new way especially for combating pests, e.g. insects and acarids, with other and further objects becoming apparent from a study of the within specification and accompanying examples.

It is known from German Published Specifications DOS 2,049,695 and 2,030,509 and Belgian Patent Specification No. 654,748 that nitrile-substituted and-/or carbalkoxy-substituted vinyl-(thiono)phosphoric acid esters, such as, for example, O,O-diethyl-O-[1-phenyl- (Compound A) or 1-o-methylphenyl- (Compound B) or 1-m-methoxyphenyl- (Compound C) or 1-(2',5'-dichlorophenyl)-2-cyanovinyl]-thiono- (Compound D), O,O-diethyl-O-(1-methyl-2-phenyl-2-cyanovinyl)-thiono- (Compound E) and O,O-diethyl--(1-phenyl-2-methyl-2-cyanovinyl)thiono-phosphoric acid ester (Compound F) and O-ethyl-O-(1-methyl-2-cyano-2-carbethoxyvinyl)-ethane-phosphonic acid ester (Compound G), possess isecticidal and acaricidal properties.

The present invention provides O-ethyl-S-n-propyl-O-vinyl-thionothiolphosphoric acid esters of the general formula

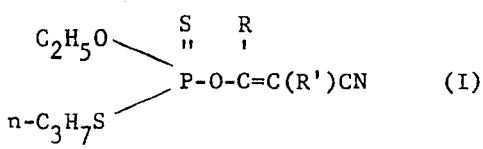

P-O-C=C(R')CN    (I)

in which
R is lower alkyl, carbo-lower alkoxy, or phenyl or naphthyl optionally substituted by halogen, nitro, nitrile, lower alkyl, lower alkoxy or halo-lower alkyl and
R' is hydrogen or lower alkyl.

Preferably, R is alkyl of 1 to 4 carbon atoms, especially methyl or ethyl, carbalkoxy with 1 to 6, especially 1 to 4, carbon atoms in the alkyl moiety, or a phenyl or naphthyl radical which is optionally monosubstituted or polysubstituted by any one or more of chlorine, bromine, fluorine, nitro, nitrile, alkyl of 1 to 4, especially 1 to 3, carbon atoms, alkoxy of 1 to 3 carbon atoms such as methoxy and ethoxy, or haloalkyl of 1 to 3 carbon atoms such as trihalomethyl and haloethyl; and R' is hydrogen or straight-chain or branched alkyl with 1 to 6, especially 1 to 4, carbon atoms.

The general formula (I) here includes the corresponding cis-isomers and trans-isomers of the structure (Ia) and (Ib) and mixtures of these two isomers:

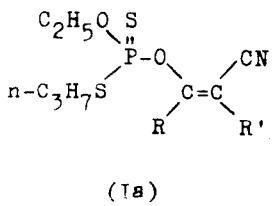

(Ia)

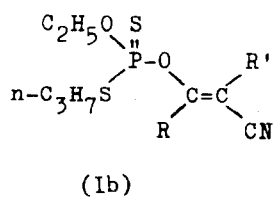

(Ib)

Surprisingly, the O-ethyl-S-n-propyl-O-vinylthionothiolphosphoric acid esters according to the invention display a better insecticidal and acaricidal action, with substantially lower toxicity, than the previously known compounds of analogous structures and of the same type of action. The products according to the present invention thus represent a genuine enrichment of the art. Furthermore, the new substances contribute to meeting the constant demand for new preparations in the field of pesticides. This demand is due to the fact that the commercially available agents have to meet higher and higher standards, particularly with respect to the protection of the environment, such as low toxicity to warm-blooded animals and low phytotoxicity, rapid degradation in and on the plant so that they will no longer be present even if harvesting takes place shortly after application of the pesticide, or activity against resistant pests.

The invention also provides a process for the production of an O-ethyl-S-n-propyl-O-vinyl-thionothiolphosphoric acid ester of the formula (I) in which an O-ethyl-S-n-propyl-thionothiol-phosphoric acid diester halide of the formula

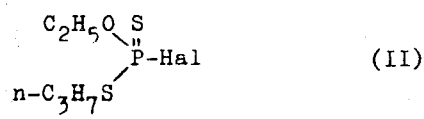

in which Hal is halogen, preferably chlorine,
is reacted with a ketonitrile of the formula (III) which embraces its enol of the formula (IV):

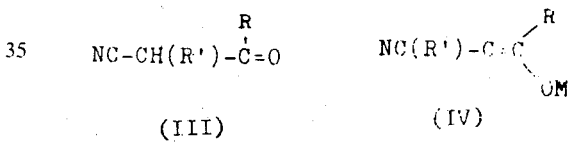

in which
R and R' have the abovementioned meanings and
M is one equivalent of an alkali metal, alkaline earth metal or ammonium,
optionally in the presence of an acid acceptor.

If, for example, benzoylpropionitrile or its sodium salt and O-ethyl-S-n-propylthionothiolphosphoric acid diester chloride are used as starting substances, the course of the reaction according to the invention can be represented by the following formula scheme:

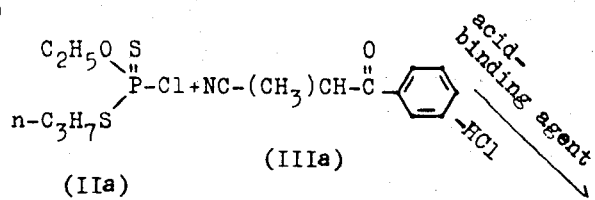

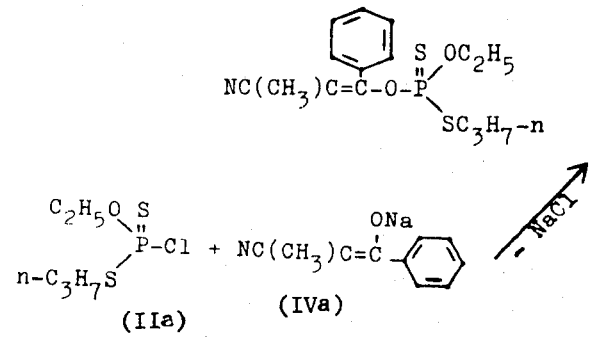

The O-ethyl-S-n-propyl-thionothiolphosphoric acid diester halides to be used as the starting material can be obtained according to known processes by reaction of thiono-phosphoric acid trihalides, preferably trichlorides, with n-propanol, subsequent heating in the presence of sulphurizing agents, distillation of the intermediate product and further reaction with alkali metal ethylate.

The ketonitriles of the formula (III), or their enol form (IIIa), some of which are known, can also be prepared according to processes which are in principle known, for example if a. alkylnitriles are reacted with arylcarboxylic acid esters in the presence of alcoholates at elevated temperatures, optionally in a solvent, and the reaction mixture is subsequently treated with acids:

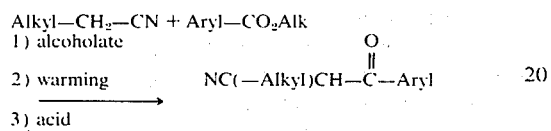

or b. aryl compounds are reacted with acetyl chloride in the presence of aluminum chloride, the intermediate product is brominated and finally the bromine is replaced by the nitrile group:

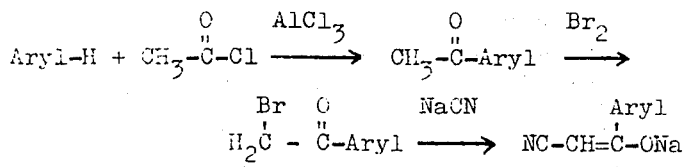

or c. arylnitriles are reacted with acetonitrile in the presence of an alkali metal and the resulting ketimine is split with acid:

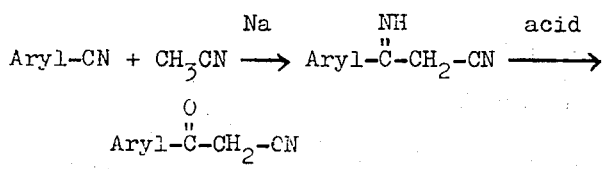

or d. in the event that in case (c) aryl is phenyl and nitro derivatives are desired, the end compound is nitrated with fuming nitric acid, for example:

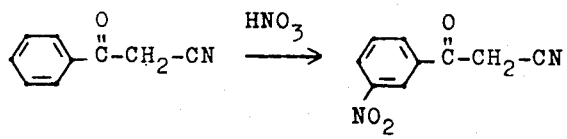

or e. isoxazole derivatives are reacted with potassium tert.-butylate:

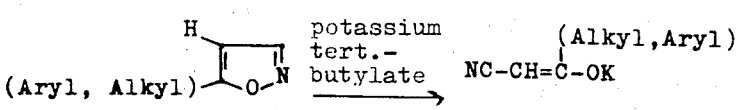

or f. alkylnitriles are reacted with oxalic acid esters in the presence of alcoholates:

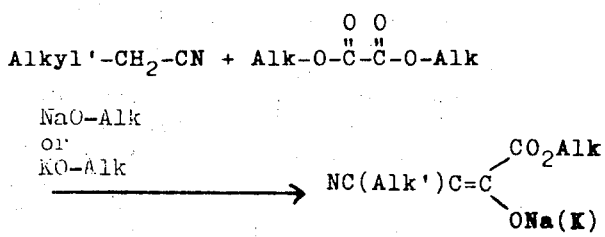

The following may be mentioned individually as examples of ketonitriles (III) or their enol salts (IV) which are to be used in the process of the invention:

2-, 3- and 4-chloro-, 2,3-, 3,4-, 2,6-dichloro-, 2,3,4-, 2,3,5-, 2,3,6-, 2,4,5-, 2,4,6-, 3,4,5- and 3,4,6-trichlorobenzoyl- or naphthoyl-acetonitrile and the corresponding bromine and fluorine derivatives, and also 3-nitro-, 3-trifluoromethyl-, 4-cyano-, 2-, 3- and 4-methyl-, 2-, 3- and 4-ethyl-, 2-, 3- and 4-n-propyl-, 2-, 3- and 4-isopropyl-, 2-, 3- and 4-methoxy-, 2-, 3- and 4-ethoxy-, 2,4-dimethyl-, 2,4-diethyl, 2,4-di-n-propyl-, 2,4-di-isopropyl-, 2,5-dimethyl-, 2,5-diethyl-, 2,5-di-n-propyl-, 2,5-di-isopropyl-benzoyl-acetonitrile or -propionitrile and the corresponding alkali metal salts, also the alkali metal salts of 3-cyano or 3-cyano-3-methyl-pyruvic acid methyl ester, ethyl ester, n-propyl ester, iso-propyl ester, n-butyl ester, sec.-butyl ester, iso-butyl ester and tert.-butyl ester, the corresponding 3-cyano-3-ethyl-, -3-n-propyl-, -3-iso-propyl-, -3-n-butyl- and -3-sec.-butyl-pyruvic acid alkyl esters and finally the alkali metal salts of acetylacetonitrile and propionylacetonitrile.

The phosphorylation process for the preparation of the new substances of the formula (I) is preferably carried out with the use of a solvent which term includes a mere diluent. Practically all inert organic solvents can be used for this purpose. These in particular include optionally chlorinated aliphatic and aromatic hydrocarbons, for example benzene, toluene, xylene, benzine, methylene chloride, chloroform, carbon tetrachloride or chlorobenzene; ethers, for example diethyl ether, dibutyl ether and dioxan; ketones, for example acetone, methyl ethyl ketone, methyl isopropyl ketone and methyl isobutyl ketone; nitriles, for example acetonitrile and propionitrile; and amides, for example dimethylformamide.

All customary acid-binding agents can be used as acid acceptors. Alkali metal carbonates and alkali metal alcoholates, such as sodium carbonate and potassium carbonate, sodium methylate and ethylate and potassium methylate and ethylate, and potassium tert.-butylate, and also aliphatic, aromatic or heterocyclic amines, for example triethylamine, dimethylamine, dimethylaniline, dimethylbenzylamine and pyridine, have proved particularly suitable.

The reaction temperature can be varied over a wide range. In general, the reaction is carried out at 0° to 100°C, preferably at 0° to 50°C.

The reaction is in general allowed to take place under normal pressure.

To carry out the process, the starting substances are generally employed in equimolar ratio. An excess of one or other component produces no significant advantages. In general, the phosphoric acid component is added dropwise to the keto compound or enol compound, the latter being employed, if appropriate, without intermediate isolation and optionally in one of the indicated solvents, and if appropriate the mixture is allowed to continue to react for 1 or more hours, with warming. After cooling, the reaction solution may be taken up in an organic solvent and the organic phase worked up in the usual manner, for example by washing, drying and distillation.

The new compounds are obtained in the form of oils which in some cases cannot be distilled without decomposition but can, by so-called "slight distillation", that is to say prolonged heating under reduced pressure to moderately elevated temperatures, be freed of the last volatile constituents and can be purified in this way. They are characterized by the refractive index.

The O-ethyl-S-n-propyl-O-vinyl-thionothiolphosphoric acid esters according to the invention are distinguished by outstanding insecticidal and acaricidal activity against plant pests, hygiene pests and pests of stored products. They couple a low phytotoxicity and very low toxicity towards warm-blooded animals with a good action against both sucking and biting insects.

For this reason, the compounds according to the invention can be employed successfully as pesticides in plant protection and in the hygiene field and the field of protection of stored products.

To the sucking insects there belong, in the main, aphids (*Aphidae*) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (*Coccina*), for example the oleander scale (*Aspidiotus hederae*) and the soft scale (*Lecanium hesperidum*) as well as the grape mealybug (*Pseudococcus maritimus*); thrips (*Thysanoptera*), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*.

In the case of the biting insects, above all there should be mentioned butterfly caterpillars (*Lepidoptera*) such as the diamond-back moth (*Plutella maculipennis*), the gypsy moth (*Lymntria dispar*), the browntail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cneimatobia brumata*), the green oak tortrix moth (*Tortrix viridana*), the fall arymworm (*Laphygma frugiperda*) and cotton worm (*Prodenia litura*), the ermine moth (*Hyponomeuta padella*), the Mediterranean flour moth (*Ephestia kühniella*) and greater wax moth (*Galleria mellonella*).

Also to be classed with the biting insects are bettles (*Coleoptera*), for example the granary weevil (*Sitophilus granarius = Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (Bruchidius = *Acanthoscelides obtectus*), the leather beetle (*Dermestes frischi*), the khapra beetle (*Trogoderma granarium*), the flour beetle (*Tribolium castaneum*), the northern corn billbug (Calandra or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (*Agriotes spec.*) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, *Orthoptera*, for example the house cricket (*Gryllus domesticus*); termites such as the eastern subterranean termite (*Reticulitermes flavipes*) and *Hymenoptera* such as ants, for example the garden ant (*Lasius niger*).

The *Diptera* comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further gnats, for example mosquitoes such as the yellow fever mosquito (*Aedes aegypti*), the northern house mosquito (*Culex pipiens*) and the malaria mosquito (*Anopheles stephensi*).

With the mites (*Acari*) there are classed, in particular, the spider mites (*Tetranychidae*) such as the twospotted spider mite (*Tetranychus telarius = Tetranychus althaeae* or *Tetranychus urticae*) and the European red mite (*Paratetranychus pilosus = Panonychus ulmi*), gall mites, for example the blackcurrant gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*).

When applied against hygiene pests and pests of stored products, particularly flies and mosquitoes, the process products are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, anomatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides, (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, albumin hydrolyzates, etc., and especially alkyl aryl-polyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides and acaricides, or fungicides, bactericides, rodenticides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects and acarids, which comprises applying to at least one of correspondingly (a) such insects, (b) such acarids, and (c) the corresponding habitat thereof, i.e. the locus to be protected, a correspondingly combative or toxic amount, i.e. an insecticidally or acaricidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, dressing, encrusting, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples.

The ketonitriles, or their alkali salts, which were to be used as starting compounds can be obtained by, for example, the following methods:

EXAMPLE 1

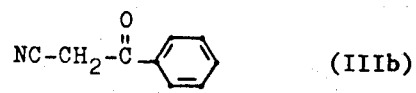

(IIIb)

150 g (1 mole) of benzoic acid ethyl ester (or 136 g (1 mole) of benzoic acid methyl ester) and 54 g (1 mole) of sodium methylate were stirred on an oil bath at 80°C to give a gelatinous mass. 51 g (1.25 moles) of acetonitrile were introduced under the surface of the homogeneous mass and the bath temperature was raised to 120° – 140°C. After 12 hours, the reaction mixture was cooled and poured in 2 l. of water. The mixture was extracted once with benzene to remove neutral compounds and was then acidified with concentrated hydrochloric acid. The precipitate which formed was taken up in benzene. After stripping off the benzene, a solid residue remained, which was recrystallized from a little ethanol. 112 g (79% of theory) of ω-cyanoacetophenone of melting point 80° to 82°C were obtained. Example 2

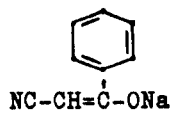

NC–CH=C–ONa (IVb)

136 g (1 mole) of benzoic acid methyl ester (or 150 g (1 mole) of benzoic acid ethyl ester) and 54 g (1 mole) of sodium methylate were heated to 80°C on an oil bath and stirred to give a gelatinous mass. 51 g (1.25 moles) of acetonitrile were introduced under the surface of the homogeneous mass and the bath temperature was raised to 120° – 40°C. After 12 hours, the mixture was cooled to −10°C and the sodium salt which had precipitated was filtered off. It was repeatedly digested with ether and then dried in a desiccator. The yield was 100 g (60% of theory).

EXAMPLE 3

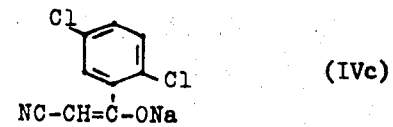

NC–CH=C–ONa (IVc)

A solution of 10.8 g of sodium cyanide in 20 ml of water and 20 ml of ethanol was added dropwise to 26.8 g (0.1 mole) of 2′,5′-dichloro-2-bromoacetophenone (prepared from p-dichlorobenzene and acetyl chloride by the Friedel-Crafts method, with subsequent bromination in ether) in 30 ml of ethanol, while stirring, during which addition the temperature of the mixture rose to 50°C. The batch was stirred for a further 15 minutes and cooled to 10°C, and the salt which had precipitated was thoroughly drained under suction. It was rinsed with ether and dried for 5 hours at 100° to 110°C under reduced pressure. 19.5 g (83% of theory) of a beige powder of melting point >300°C were thus obtained.

The following benzoyl-acetonitriles and benzoyl-propionitriles and their sodium salts were also obtainable analogously:

Table I

| Structure | | Yield (% of theory) | Physical properties (Boiling point or melting point) | Prepared analogously to method |
|---|---|---|---|---|
| NC—CH₂—CO—⟨⟩—Cl (IIIc) | | 68 | 129°C | 1 |
| NC—CH₂—CO—⟨⟩ (IIId) with Cl | | 53 | 75–78°C | 1 |
| NC—CH₂—CO—⟨⟩ (IIIe) with Cl | | 43 | 125°C | 1 |
| NC—CH₂—CO—⟨⟩ (IIIf) with Br | | 35 | 150–160°C/ 4 mm Hg | 1 |
| NC—CH₂—CO—⟨⟩—CH₃ (IIIg) | | 33 | 100°C | 1 |
| NC—CH₂—CO—⟨⟩ (IIIh) with CH₃ | | 49 | 72°C | 1 |
| NC—CH₂—CO—⟨⟩ (IIIi) with CH₃ | | 37 | 84–85°C | 1 |
| NC—CH=C(ONa)—⟨⟩—OCH₃ (IIId) | | 77 | — | 2 |

Table 1—Continued

| Structure | Yield (% of theory) | Physical properties (Boiling point or melting point) | Prepared analogously to method |
|---|---|---|---|
| NC—CH$_2$—CO—C$_6$H$_4$(OCH$_3$) (meta) (IIIj) | 71 | 88°C | 1 |
| NC—CH$_2$—CO—C$_6$H$_4$(OCH$_3$) (ortho) (IIIk) | 50 | 67°C | 1 |
| NC(CH$_{NC\ 3}$)CH—CO—C$_6$H$_5$ (IIIl) | 41 | n$_D^{20}$: 1.5398; 128°C/3 mm Hg | 1 |
| ND—CH$_2$—CO—C$_6$H$_4$—CF$_3$ (IIIm) | 84 | 55–56°C | 1 |
| NC—CH$_2$—CO—(1-naphthyl) (IIIn) | 46 | 85°C | 3 |
| NC—CH$_2$—CO—(2-naphthyl) (IIIo) | 65 | 128°C | 1 |
| NC—CH=C(ONa)—C$_6$H$_3$Cl$_2$ (2,4-di-Cl) (IVe) | 51 | — | 3 |
| NC—CH=C(ONa)—C$_6$H$_4$—F (IVf) | 75 | 284°C (decomposition) | 3 |
| NC—CH=C(ONa)—C$_6$H$_4$—Br (IVg) | 82 | — | 3 |
| NC—CH=C(ONa)—C$_6$H$_3$Br$_2$ (IVh) | 37 | 272°C (decomposition) | 3 |
| NC—CH=C(ONa)—C$_6$H$_3$Cl$_2$ (IVi) | 60 | — | 3 |
| NC—CH=C(ONa)—C$_6$H$_4$—CN (IVj) | 84 | — | 3 |
| NC—CH=C(ONa)—C$_6$H$_4$—Cl (IVk) | 77 | — | 3 |
| NC—CH=C(ONa)—C$_6$H$_3$Cl$_2$ (IVl) | 84 | — | 3 |
| NC—CH$_2$—CO—C$_6$H$_3$(CH$_3$)$_2$ (IIIp) | 20 | 74°C | 3 |

Table 1—Continued

| Structure | Yield (% of theory) | Physical properties (Boiling point or melting point) | Prepared analogously to method |
|---|---|---|---|
| NC—CH₂—CO—C₆H₃(C₃H₇-i)(C₃H₇-i) (IIIq) | 18 | 56°C | 3 |
| NC—CH₂—CO—C₆H₃(CH₃)(CH₃) (IIIr) | 22 | 71°C | 3 |

EXAMPLE 4

$$NC(CH_3)C=C(CO_2-C_3H_7-i)-OK \quad (IVm)$$

A mixture of 113 g (1 mole) of potassium tert.-butylate, 174 g (1 mole) of oxalic acid diisopropyl ester, 60.5 g (1.1 mole) of propionitrile and 400 ml of i-propanol was heated to 80°-90°C for 4 to 6 hours and after cooling one liter of ether was added. The precipitate which separated out was filtered off and dried in a desiccator. 145 g (70% of theory) of the sodium salt of 3-cyanopyruvic acid isopropyl ester were obtained.

The following compounds can be prepared analogously:

Table 2

| Structure | Yield (% of theory) |
|---|---|
| NC(CH₃)C=C(CO₂CH₃)(OK) (IVn) | 45 |
| NC(CH₃)C=C(CO₂C₂H₅)(OK) (IVo) | 75 |
| NC(CH₃)C=C(CO₂C₄H₉—sec.)(OK) (IVp) | 52 |
| NC—CH=C(CO₂C₃H₇—i)(ONa) (IVq) | 83 |
| NC—CH=C(CO₂—C₄H₉—sec.)(OK) (IVr) | 87 |
| NC(C₃H₇—n)C=C(CO₂—C₂H₅)(OK) (IVs) | 53 |
| NC—(C₃H₇—n)C=C(CO₂—C₃H₇—i)(OK) (IVt) | 48 |
| NC(C₃H₇—i)C=C(CO₂C₂H₅)(OK) (IVu) | 32 |
| NC—(C₄H₉—n)C=C(CO₂—C₂H₅)(OK) (IVv) | 48 |

EXAMPLE 5

$$NC-CH_2-C(=O)-C_6H_4-NO_2 \quad (IIIs)$$

72.5 g (0.5 mole) of 2-cyanoacetophenone were added in small portions to 180 g of fuming nitric acid ($d = 1.5$) at −15°C, the batch was stirred for a further hour at −5°C and the reaction mixture was subsequently poured onto ice. The product which precipitated was filtered off and recrystallized from a little ethanol. 44 g (46% of theory) of 2-cyano-3'-nitroacetophenone of melting point 138° to 140°C were obtained.

EXAMPLE 6

$$\begin{array}{c}C_2H_5O\\n-C_3H_7S\end{array}\!\!\!\!\!>\!\!\!\overset{S}{\underset{\|}{P}}\!-O-C=C(CH_3)CN \quad (1)$$
$$\phantom{xxxxxxxxxxxxxx}CO_2-C_3H_7-i$$

19.1 g (0.1 mole) of the sodium salt of 3-cyanopyruvic acid isopropyl ester was suspended in 200 ml of acetonitrile. 21.8 g (0.1 mole) of O-ethyl-S-n-propyl-thionothiolphosphoric acid ester chloride were added dropwise to this suspension and the batch was allowed to react for a further 4 hours at 40°C. The reaction mixture was then cooled and poured into 500 ml of toluene and the organic phase was washed with saturated sodium bicarbonate solution and water and dried over sodium sulfate. The solvent was then evaporated off under reduced pressure and the residue was subjected to incipient distillation. 30.2 g (86% of theory) of O-ethyl-S-n-propyl-O-(1-carbisopropoxy-2-methyl-2-cyanovinyl)-thionothiolphosphoric acid ester were obtained in the form of a yellow oil of refractive index $n_D^{22}$: 1.5149.

The following compounds were obtained analogously:

14.5 g (0.1 mole) of ω-cyanoacetophenone were added to a solution of 5.4 g (0.1 mole) of sodium methylate and 100 ml of methanol. When the ω-cyanoacetophenone had completely dissolved the solvent was evaporated off and the residue was suspended in 150 ml of acetonitrile. 21.8 g (0.1 mole) of O-ethyl-S-n-isopropyl-thionothiolphosphoric acid ester chloride were added dropwise to this suspension and the batch was allowed to react for a further 4 hours at 40°C. The reaction mixture was then cooled and poured into 500 ml of toluene and the toluene solution Table 3

$$\underset{n-C_3H_7S}{\overset{C_2H_5O}{>}}\overset{S}{\underset{\|}{P}}-O-\overset{R}{\underset{|}{C}}=C(R')CN \qquad (I)$$

| | R | R' | Physical properties (refractive index) | Yield (% of theory) |
|---|---|---|---|---|
| (2) | —CO—OC$_3$H$_7$—i | n—C$_3$H$_7$— | $n_D^{25}$: 1.5062 | 63 |
| (3) | —CO—OC$_2$H$_5$ | n—C$_3$H$_7$— | $n_D^{25}$: 1.5128 | 74 |
| (4) | —CO—OC$_2$H$_5$ | i-C$_3$H$_7$— | $n_D^{25}$: 1.5169 | 58 |
| (5) | —CO—OC$_2$H$_5$ | n—C$_4$H$_9$— | $n_D^{25}$: 1.5107 | 79 |
| (6) | —CO—OCH$_3$ | CH$_3$— | $n_D^{24}$: 1.5306 | 74 |
| (7) | —CO—OC$_2$H$_5$ | CH$_3$— | $n_D^{25}$: 1.5182 | 74 |
| (8) | —CO—O—CH—CH$_2$—CH$_3$<br>　　　　　\|<br>　　　　　CH$_3$ | CH$_3$— | $n_D^{25}$: 1.5108 | 70 |
| (9) | —CO—O—CH—CH$_2$—CH$_3$<br>　　　　　\|<br>　　　　　CH$_3$ | H— | $n_D^{23}$: 1,5118 | 72 |
| (10) | —CO—OC$_3$H$_7$—i | H— | $n_D^{23}$: 1.5109 | 69 |

EXAMPLE 7

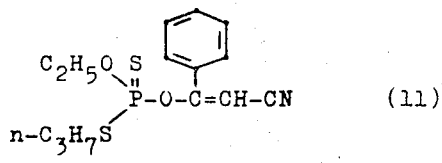

(11)

was washed with saturated sodium bicarbonate solution and water and dried over sodium sulfate. The solvent was then evaporated off under reduced pressure and the residue was subjected to incipient distillation. 31.5 g (96% of theory) of O-ethyl-S-n-propyl-O-(1-phenyl-2-cyano-vinyl)-thionothiolphosphoric acid ester were obtained in the form of a yellow oil of refractive index $n_D^{22}$: 1.5683.

The following compounds were obtained analogously:

Table 4

$$\underset{n-C_3H_7S}{\overset{C_2H_5O}{>}}\overset{S}{\underset{\|}{P}}-O-\overset{R}{\underset{|}{C}}=C(R')CN \qquad (I)$$

| | R | R' | Physical properties (refractive index) | Yield (% of theory) |
|---|---|---|---|---|
| (12) | ⌬—Cl | H | $n_D^{22}$: 1.5788 | 66 |
| (13) | ⌬—CH$_3$ | H | $n_D^{25}$: 1.5600 | 77 |
| (14) | CH$_3$—⌬ | H | $n_D^{25}$: 1.5991 | 76 |
| (15) | ⌬—CH$_3$ | H | $n_D^{25}$: 1.5669 | 79 |
| (16) | ⌬—OCH$_3$ | H | $n_D^{25}$: 1.5708 | 84 |

Table 4 – Continued $$\begin{array}{c} C_2H_5O \\ n-C_3H_7S \end{array} \!\!\! \overset{S}{\underset{}{P}} \!\!-\!\! O \!\!-\!\! \overset{R}{\underset{}{C}} \!\!=\!\! C(R')CN \quad (I)$$

| | R | R' | Physical properties (refractive index) | Yield (% of theory) |
|---|---|---|---|---|
| (17) | 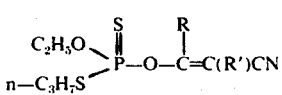 2-CH$_3$O-C$_6$H$_4$ | H | $n_D^{25}$: 1.5623 | 76 |
| (18) | 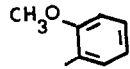 4-CH$_3$O-C$_6$H$_4$ | H | $n_D^{23}$: 1.5714 | 79 |
| (19) | 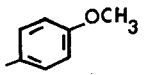 3-Cl-C$_6$H$_4$ | H | $n_D^{25}$: 1.5691 | 64 |
| (20) | 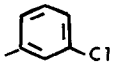 2-Cl-C$_6$H$_4$ | H | $n_D^{23}$: 1.5512 | 58 |
| (21) | 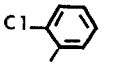 2-Br-C$_6$H$_4$ | H | $n_D^{23}$: 1.5808 | 77 |
| (22) | 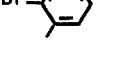 3-CF$_3$-C$_6$H$_4$ | H | $n_D^{24}$: 1.5361 | 72 |
| (23) |  1-naphthyl | H | $n_D^{24}$: 1.5601 | 95 |
| (24) | Br—— 4-Br-C$_6$H$_4$ | H | $n_D^{19}$: 1.5798 | 50 |
| (25) | F—— 4-F-C$_6$H$_4$ | H | $n_D^{19}$: 1.5590 | 70 |
| (26) | NC—— 4-NC-C$_6$H$_4$ | H | $n_D^{25}$: 1.5706 | 80 |
| (27) |  2,4-Cl$_2$-C$_6$H$_3$ | H | $n_D^{21}$: 1.5680 | 81 |
| (28) | 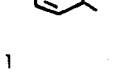 2,5-Cl$_2$-C$_6$H$_3$ | H | $n_D^{21}$: 1.5778 | 38 |
| (29) | Cl—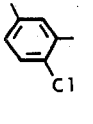 2,3,4-Cl$_3$-C$_6$H$_2$ | H | $n_D^{25}$: 1.5810 | 43 |
| (30) | CH$_3$—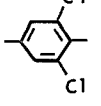 2,3-(CH$_3$)$_2$-C$_6$H$_3$ | H | $n_D^{25}$: 1.5609 | 83 |
| (31) | i-C$_3$H$_7$—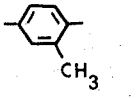 2,5-(i-C$_3$H$_7$)$_2$-C$_6$H$_3$ | H | $n_D^{21}$: 1.5450 | 63 |
| (32) | Cl—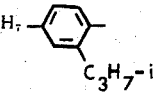 3,5-Cl$_2$-C$_6$H$_3$ | H | $n_D^{18}$: 1.5853 | 56 |

Table 4 – Continued $$\begin{array}{c} C_2H_5O \\ n-C_3H_7S \end{array} \overset{S}{\underset{\|}{P}}-O-\overset{R}{\underset{|}{C}}=C(R')CN \qquad (I)$$

| | R | R' | Physical properties (refractive index) | Yield (% of theory) |
|---|---|---|---|---|
| (33) | Br—⟨phenyl⟩—Br | H | $n_D^{23}$: 1.5972 | 48 |
| (34) | Cl—⟨phenyl⟩(Cl)(Cl)— | H | $n_D^{26}$: 1.5838 | 59 |
| (35) | CH$_3$—⟨phenyl⟩—CH$_3$ | H | $n_D^{22}$: 1.5548 | 85 |
| (36) | ⟨phenyl⟩— | CH$_3$— | $n_D^{24}$: 1.5608 | 35 |
| (37) | ⟨naphthyl⟩— | H | $n_D^{24}$: 1.6147 | 35 |

EXAMPLE 8

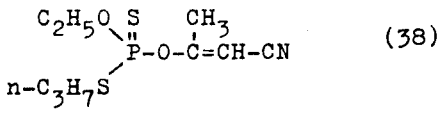

16.6 g (0.2 mole) of 5-methylisoxazole were first added dropwise to a suspension of 24.2 g (0.2 mole) of potassium tert.-butylate in 150 ml of acetonitrile while cooling with ice and stirring, and after one hour at 30°C 44 g (0.2 mole) of O-ethyl-S-n-propyl-thionothiolphosphoric acid diester chloride were added dropwise. Thereafter the mixture was warmed to 60°C for 2 hours. After cooling, the reaction mixture was poured into water and extracted by shaking with methylene chloride, the organic phase was washed with water until it gave a neutral reaction and was dried, the solvent was removed under reduced pressure and the residue was subjected to incipient distillation. 22 g (41.5% of theory) of O-ethyl-S-n-propyl-O-(1-methyl-2-cyanovinyl)-thionothiol-phosphoric acid ester were obtained in the form of a brown oil of refractive index $n_D^{24}$: 1.5328.

EXAMPLE 9

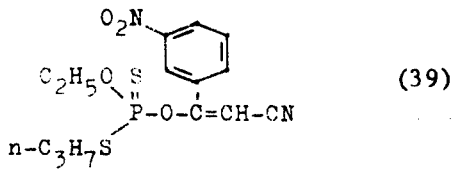

24 g (0.125 mole) of 2-cyano-3'-nitroacetophenone were dissolved in 150 ml of methyl ethyl ketone and the solution was warmed with 28 g of ground potassium hydroxide for 2 hours to 50°C. After cooling to 30°C, the reaction mixture was treated dropwise with 26 g (0.125 mole) of O-ethyl-S-n-propyl-thionothiolphosphoric acid diester chloride and warmed to 50°C for 4 hours. After cooling to room temperature, the batch was poured into water and the oil which had separated out was extracted by shaking with methylene chloride. The organic phase was washed with water until it gave a neutral reaction and was dried, the solvent was removed under reduced pressure and the residue was subjected to incipient distillation. 28 g (60% of theory) of O-ethyl-S-n-propyl-O-(1-m-nitro-phenyl-2-cyanovinyl)-thionothiolphosphoric acid ester were obtained in the form of a brown oil of refractive index $n_D^{24}$ 1.5802.

EXAMPLE 10

*Drosophila* test
Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier, and the concentrate was diluted with water to the desired concentration.

1 cc of the preparation of the active compound was applied with a pipette to a filter paper disc of 7 cm diameter. The wet disc was placed in a glass vessel containing 50 vinegar flies (*Drosophila melanogaster*) and covered with a glass plate.

After the specified periods of time, the destruction was determined as a percentage: 100% means that all the flies were killed; 0% means that none of the flies were killed.

The active compounds, their concentrations, the evaluation times and the degree of destruction can be seen from the following Table 5:

Table 5

(*Drosophila* Test)

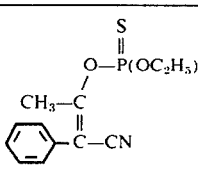

| Active compound | Active compound concentration in % | Degree of destruction in % after 1 day |
|---|---|---|
| $CH_3-C(=NOP(OC_2H_5)_2(=S))-C(=O)-C_6H_4-CN$ (known) (E) | 0.1 | 20 |
| (23) | 0.1 | 100 |
|  | 0.01 | 100 |
| (24) | 0.1 | 100 |
|  | 0.01 | 100 |
| (13) | 0.1 | 100 |
|  | 0.01 | 100 |
| (15) | 0.1 | 100 |
|  | 0.01 | 100 |
| (16) | 0.1 | 100 |
|  | 0.01 | 100 |
| (18) | 0.1 | 100 |
|  | 0.01 | 100 |
| (22) | 0.1 | 100 |
|  | 0.01 | 100 |
| (20) | 0.1 | 100 |
|  | 0.01 | 100 |
| (19) | 0.1 | 100 |
|  | 0.01 | 100 |
| (12) | 0.1 | 100 |
|  | 0.01 | 100 |
| (28) | 0.1 | 100 |
|  | 0.01 | 100 |
| (27) | 0.1 | 100 |
|  | 0.01 | 100 |
| (21) | 0.1 | 100 |
|  | 0.01 | 100 |
| (26) | 0.1 | 100 |
|  | 0.01 | 100 |
| (39) | 0.1 | 100 |
|  | 0.01 | 100 |
| (25) | 0.1 | 100 |
|  | 0.01 | 100 |
| (38) | 0.1 | 100 |
|  | 0.01 | 100 |
|  | 0.001 | 100 |
| (10) | 0.1 | 100 |
|  | 0.01 | 100 |
| (6) | 0.1 | 100 |
|  | 0.01 | 100 |
| (7) | 0.1 | 100 |
|  | 0.01 | 100 |
| (1) | 0.1 | 100 |
|  | 0.01 | 100 |
| (3) | 0.1 | 100 |
|  | 0.01 | 100 |
| (4) | 0.1 | 100 |
|  | 0.01 | 100 |

EXAMPLE 11

*Plutella* test

Solvent: 3 parts by weight of acetone
Emulsifier: 1 part by weight of alkylaryl polyglycol ether To produce a suitable preparation of active compound, 1 part by weight of the active compound was mixed with the stated amount of solvent containing the stated amount of emulsifier and the concentrate was diluted with water to the desired concentration.

Cabbage leaves (*Brassica oleracea*) were sprayed with the preparation of the active compound until dew moist and were then infested with caterpillars of the diamond-back moth (*Plutella maculipennis*).

After the specified periods of time, the degree of destruction was determined as a percentage; 100% means that all the caterpillars were killed whereas 0% means that none of the caterpillars were killed.

The active compounds, the concentrations of the active compounds, the evaluation times and the results can be seen from the following Table 6:

Table 6

(*Plutella* Test)

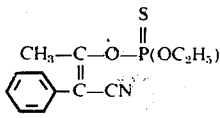

| Active compound | Active compound concentration in % | Degree of destruction in % after 3 days |
|---|---|---|
| $CH_3-C(=NOP(OC_2H_5)_2(=S))-C(=O)-C_6H_4-CN$ (known) (E) | 0.1 | 90 |
|  | 0.01 | 0 |
| (23) | 0.1 | 100 |
|  | 0.01 | 100 |
| (36) | 0.1 | 100 |
|  | 0.01 | 100 |
| (11) | 0.1 | 100 |
|  | 0.01 | 100 |
|  | 0.001 | 85 |
| (14) | 0.1 | 100 |
|  | 0.01 | 100 |
|  | 0.001 | 100 |
| (13) | 0.1 | 100 |
|  | 0.01 | 100 |
| (15) | 0.1 | 100 |
|  | 0.01 | 100 |
|  | 0.001 | 80 |
| (30) | 0.1 | 100 |
|  | 0.01 | 100 |
|  | 0.001 | 90 |
|  | 0.0001 | 30 |
| (17) | 0.1 | 100 |
|  | 0.01 | 100 |
|  | 0.001 | 100 |
| (16) | 0.1 | 100 |
|  | 0.01 | 100 |
| (18) | 0.1 | 100 |
|  | 0.01 | 100 |
| (31) | 0.1 | 100 |
|  | 0.01 | 100 |
| (22) | 0.1 | 100 |
|  | 0.01 | 100 |
| (20) | 0.1 | 100 |
|  | 0.01 | 100 |
|  | 0.001 | 95 |
| (19) | 0.1 | 100 |
|  | 0.01 | 100 |
| (12) | 0.1 | 100 |
|  | 0.01 | 100 |
|  | 0.001 | 60 |
| (28) | 0.1 | 100 |
|  | 0.01 | 100 |
| (27) | 0.1 | 100 |
|  | 0.01 | 100 |
| (32) | 0.1 | 100 |
|  | 0.01 | 100 |
| (29) | 0.1 | 100 |
|  | 0.01 | 100 |
| (34) | 0.1 | 100 |
|  | 0.01 | 100 |
| (21) | 0.1 | 100 |
|  | 0.01 | 100 |
|  | 0.001 | 50 |
| (24) | 0.1 | 100 |
|  | 0.01 | 100 |
| (33) | 0.1 | 100 |
|  | 0.01 | 100 |
| (26) | 0.1 | 100 |
|  | 0.01 | 100 |
| (39) | 0.1 | 100 |
|  | 0.01 | 100 |
| (25) | 0.1 | 100 |

Table 6-Continued (Plutella Test)

| Active compound | Active compound concentration in % | Degree of destruction in % after 3 days |
|---|---|---|
| | 0.01 | 100 |
| | 0.001 | 85 |
| (38) | 0.1 | 100 |
| | 0.01 | 100 |
| (6) | 0.1 | 100 |
| | 0.01 | 100 |
| (7) | 0.1 | 100 |
| | 0.01 | 100 |
| | 0.001 | 100 |
| (1) | 0.1 | 100 |
| | 0.01 | 100 |
| | 0.001 | 95 |
| (8) | 0.1 | 100 |
| | 0.01 | 100 |
| | 0.001 | 100 |
| (3) | 0.1 | 100 |
| | 0.01 | 100 |
| | 0.001 | 100 |
| (2) | 0.1 | 100 |
| | 0.01 | 100 |
| | 0.001 | 100 |
| (4) | 0.1 | 100 |
| | 0.01 | 100 |
| | 0.001 | 95 |
| (5) | 0.1 | 100 |
| | 0.01 | 100 |
| | 0.001 | 100 |
| (35) | 0.1 | 100 |
| | 0.01 | 100 |
| | 0.001 | 85 |
| (37) | 0.1 | 100 |
| | 0.01 | 100 |

EXAMPLE 12

*Myzus* test (contact action)

Solvent: 3 parts by weight of acetone

Emulsifier: 1 part by weight of alkylaryl polyglycol ether

To produce a suitable preparation of active compound, 1 part by weight of the active compound was mixed with the stated amount of solvent containing the stated amount of emulsifier and the concentrate was diluted with water to the desired concentration.

Cabbage plants (*Brassica oleracea*) which had been heavily infested with peach aphids (*Myzus persicae*) were sprayed with the preparation of the active compound until dripping wet.

After the specified periods of time, the degree of destruction was determined as a percentage: 100% means that all the aphids were killed whereas 0% means that none of the aphids were killed.

The active compounds, the concentrations of the active compounds, the evaluation times and the results can be seen from the following Table 7:

Table 7

(Myzus test)

| Active compound | Active compound concentration in % | Degree of destruction in % after 1 day |
|---|---|---|
| CH₃—C(=O)—O—P(=O)(OC₂H₅)(C₂H₅)<br>C₂H₅O—CO—C—CN<br>(known) (G) | 0.1 | 100 |
| | 0.01 | 0 |
| CH₃—C(=S)—O—P(OC₂H₅)₂ | 0.1 | 98 |
| | 0.01 | 20 |

Table 7-Continued (Myzus test)

| Active compound | Active compound concentration in % | Degree of destruction in % after 1 day |
|---|---|---|
| C₆H₅—C—CN (known) (E) | | |
| C₆H₅—C(=S)—O—P(OC₂H₅)₂<br>CH₃—C—CN<br>(known) (F) | 0.1 | 98 |
| | 0.01 | 20 |
| (11) | 0.1 | 100 |
| | 0.01 | 100 |
| | 0.001 | 45 |
| (14) | 0.1 | 100 |
| | 0.01 | 100 |
| | 0.001 | 70 |
| (17) | 0.1 | 100 |
| | 0.01 | 100 |
| | 0.001 | 65 |
| (12) | 0.1 | 100 |
| | 0.01 | 100 |
| | 0.001 | 60 |
| (8) | 0.1 | 100 |
| | 0.01 | 100 |
| | 0.001 | 50 |
| (3) | 0.1 | 100 |
| | 0.01 | 99 |
| | 0.001 | 70 |
| (2) | 0.1 | 100 |
| | 0.01 | 100 |
| | 0.001 | 50 |
| (35) | 0.1 | 100 |
| | 0.01 | 100 |
| | 0.001 | 65 |

EXAMPLE 13

*Tetranychus* test

Solvent: 3 parts by weight of acetone

Emulsifier: 1 part by weight of alkylaryl polyglycol ether

To produce a suitable preparation of active compound, 1 part by weight of the active compound was mixed with the stated amount of solvent containing the stated amount of emulsifier and the concentrate so obtained was diluted with water to the desired concentration.

Bean plants (*Phaseolus vulgaris*), which had a height of approximately 10–30 cm., were sprayed with the preparation of the active compound until dripping wet. These bean plants were heavily infested with the two-spotted spider mite (*Tetranychus urticae*) in all stages of development.

After the specified periods of time, the effectiveness of the preparation of active compound was determined by counting the dead mites. The degree of destruction thus obtained was expressed as a percentage: 100% means that all the spider mites were killed whereas 0% means that none of the spider mites were killed.

The active compounds, the concentrations of the active compounds, the evaluation times and the results can be seen from the following Table 8:

Table 8

(Tetranychus Test)

| Active compound | Active compound concentration in % | Degree of destruction in % after 2 days |
|---|---|---|
| CH₃—C(=S)—O—P(OC₂H₅)₂ with phenyl-C(=S)—CN (known) (E) | 0.1 | 0 |
| Phenyl—C(=S)—O—P(OC₂H₅)₂ with H—C(=S)—CN (known) (A) | 0.1 / 0.01 | 99 / 0 |
| (2-CH₃-phenyl)—C(=S)—O—P(OC₂H₅)₂ with H—C(=S)—CN (known) (B) | 0.1 / 0.01 | 90 / 0 |
| (3-CH₃O-phenyl)—C(=S)—O—P(OC₂H₅)₂ with H—C(=S)—CN (known) (C) | 0.1 | 0 |
| CH₃O—(4-phenyl)—C(=S)—O—P(OC₂H₅)₂ with H—C(=S)—CN (known) (H) | 0.1 / 0.01 | 40 / 0 |
| (2,4-Cl₂-phenyl)—C(=S)—O—P(OC₂H₅)₂ with H—C(=S)—CN (known) (D) | 0.1 / 0.01 | 60 / 0 |
| (36) | 0.1 / 0.01 | 100 / 90 |
| (11) | 0.1 / 0.01 / 0.001 | 100 / 100 / 30 |
| (14) | 0.1 / 0.01 | 100 / 90 |
| (13) | 0.1 / 0.01 | 98 / 95 |
| (30) | 0.1 / 0.01 | 100 / 95 |
| (17) | 0.1 / 0.01 / 0.001 | 100 / 99 / 96 |
| (16) | 0.1 / 0.01 | 100 / 95 |
| (18) | 0.1 / 0.01 | 100 / 98 |
| (31) | 0.1 / 0.01 | 100 / 70 |
| (20) | 0.1 / 0.01 / 0.001 | 100 / 96 / 65 |
| (19) | 0.1 / 0.01 | 100 / 98 |
| (28) | 0.1 / 0.01 / 0.001 | 100 / 99 / 75 |
| (27) | 0.1 / 0.01 / 0.001 | 100 / 100 / 65 |
| (32) | 0.1 / 0.01 | 100 / 100 |
| (29) | 0.1 / 0.01 | 98 / 90 |
| (34) | 0.1 / 0.01 | 100 / 90 |
| (21) | 0.1 / 0.01 | 100 / 100 |
| (33) | 0.001 / 0.1 / 0.01 / 0.001 | 80 / 100 / 90 / 30 |
| (26) | 0.1 / 0.01 | 100 / 80 |
| (25) | 0.1 / 0.01 | 100 / 90 |
| (7) | 0.1 / 0.01 | 100 / 70 |
| (8) | 0.1 / 0.01 | 100 / 100 |
| (35) | 0.1 / 0.01 | 99 / 80 |

It will be appreciated that the instant specification and examples are set forth by way of illustration and not limitation, and that various modifications and changes may be made without departing from the spirit and scope of the present invention.

What is claimed is:

1. An O-ethyl-S-n-propyl-O-vinyl-thionothiolphosphoric acid ester of the formula $$\begin{array}{c} C_2H_5O \\ \diagdown \\ n\text{-}C_3H_7S \end{array} \!\!\! \overset{S}{\underset{\|}{P}}\!\!-\!O\!-\!C(R)\!=\!C(R')CN \qquad (I)$$

in which

R is lower alkyl, carbo-lower alkoxy, or phenyl or naphthyl optionally substituted by halogen, nitro, nitrile, lower alkyl, lower alkoxy or halo-lower alkyl, and R' is hydrogen or lower alkyl.

2. A compound according to claim 1 in which R is methyl, ethyl, carbalkoxy with 1 to 4 carbon atoms in the alkyl moiety, or phenyl or naphthyl optionally substituted by chlorine, bromine, fluorine, nitro, nitrile, trihalomethyl, haloethyl, alkyl of 1 to 3 carbon atoms, methoxy or ethoxy, and R' is hydrogen or alkyl of 1 to 4 carbon atoms.

3. The compound according to claim 1 wherein such compound is O-ethyl-S-n-propyl-O-(1-carbisopropoxy-2-methyl-2-cyanovinyl)-thionothiolphosphoric acid ester of the formula $$\begin{array}{c} C_2H_5O \\ \diagdown \\ n\text{-}C_3H_7S \end{array} \!\!\! \overset{S}{\underset{\|}{P}}\!\!-\!O\!-\!C(CO_2\text{-}C_3H_7\text{-}i)\!=\!C(CH_3)CN$$

4. The compound according to claim 1, wherein such compound is O-ethyl-S-n-propyl-O-(1-carbisopropoxy-2-n-propyl-2-cyanovinyl)-thionothiolphosphoric acid ester of the formula $$\begin{array}{c} C_2H_5O \\ \diagdown \\ n\text{-}C_3H_7S \end{array} \!\!\! \overset{S}{\underset{\|}{P}}\!\!-\!O\!-\!C(COOC_3H_7\text{-}i)\!=\!C(n\text{-}C_3H_7)CN$$

5. The compound according to claim 1 wherein such compound is O-ethyl-S-n-propyl-O-[1-(p-chlorophenyl)-2-cyanovinyl]-thionothiolphosphoric acid ester of the formula

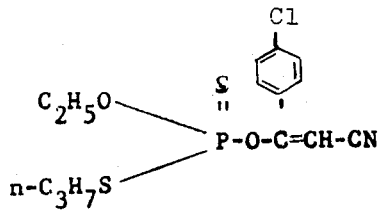

6. The compound according to claim 1 wherein such compound is O-ethyl-S-n-propyl-O-[1-(o-tolyl)-2-cyanovinyl]-thionothiolphosphoric acid ester of the formula

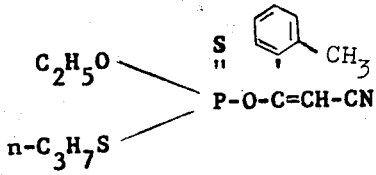

7. The compound according to claim 1 wherein such compound is O-ethyl-S-n-propyl-O-[1-(2,4-dimethylphenyl)-2-cyanovinyl]-thionothiolphosphoric acid ester of the formula

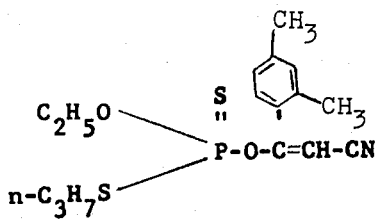

* * * * *

UNITED STATES PATENT OFFICE
CERTIFICATE OF CORRECTION

PATENT NO. : 3,892,823
DATED : July 1, 1975
INVENTOR(S) : Fritz Maurer et al.

It is certified that error appears in the above-identified patent and that said Letters Patent are hereby corrected as shown below:

Col. 1, line 28, correct spelling of "insecticidal".

Col. 9, line 26, cancel "40°C" and substitute -- 140°C --.

Col. 11, Table 1, Compound (IIIl) cancel "$(CH_{8c3})$" and substitut

-- $(CH_3)$ --

Col. 11, Table 1, Compound (IIIm), cancel "ND" and substitute

-- NC --.

Col. 19, line 56, cancel "1.5328" and substitute -- 1.5318 --.

Col. 23, Table 7, cancel second structural formula and substitute --

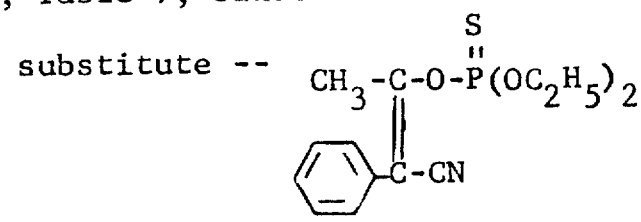

(known)          (E) --

Col. 24, Table 7, cancel structural formula "(E)".

Signed and Sealed this fourth Day of November 1975

[SEAL]

Attest:

RUTH C. MASON
Attesting Officer

C. MARSHALL DANN
Commissioner of Patents and Trademarks